US011084592B2

(12) United States Patent
Bruno et al.

(10) Patent No.: US 11,084,592 B2
(45) Date of Patent: Aug. 10, 2021

(54) AIRCRAFT ENVIRONMENTAL CONTROL SYSTEM

(71) Applicant: Hamilton Sundstrand Corporation, Charlotte, NC (US)

(72) Inventors: Louis J. Bruno, Ellington, CT (US); Christina W. Millot, Wilbraham, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 182 days.

(21) Appl. No.: 16/019,063

(22) Filed: Jun. 26, 2018

(65) Prior Publication Data

US 2019/0389587 A1 Dec. 26, 2019

(51) Int. Cl.
*B64D 13/08* (2006.01)
*B64D 13/06* (2006.01)
*F25B 9/00* (2006.01)
*B01D 53/26* (2006.01)
(Continued)

(52) U.S. Cl.
CPC .......... *B64D 13/08* (2013.01); *B01D 53/265* (2013.01); *B64D 13/06* (2013.01); *F04D 19/02* (2013.01); *F04D 29/541* (2013.01); *F25B 9/004* (2013.01); *B64D 2013/0618* (2013.01)

(58) Field of Classification Search
CPC .... B64D 2013/0611; B64D 2013/0618; B64D 2013/0648; B64D 2013/0662; B64D 2013/0688; B64D 13/08; B64D 13/06; B64D 13/02; B64D 2013/0685
See application file for complete search history.

(56) References Cited

U.S. PATENT DOCUMENTS

| 5,461,882 A | 10/1995 | Zywiak et al. |
| 5,918,472 A * | 7/1999 | Jonqueres ............. B64D 13/06 |
| | | 62/172 |
| 9,669,936 B1 | 6/2017 | Fiterman et al. |

(Continued)

FOREIGN PATENT DOCUMENTS

| EP | 3249195 A1 | 11/2017 |
| EP | 3249196 A1 | 11/2017 |

(Continued)

OTHER PUBLICATIONS

Extended European Search Report; International Application No. 19182575.1-1010; International Filing Date: Jun. 26, 2019; dated Nov. 22, 2019; 9 pages.

(Continued)

*Primary Examiner* — Cassey D Bauer
*Assistant Examiner* — Lionel Nouketcha
(74) *Attorney, Agent, or Firm* — Cantor Colburn LLP (57) ABSTRACT

An environmental control system of an aircraft includes a ram air circuit including a ram air shell having at least one heat exchanger positioned therein, a dehumidification system arranged in fluid communication with the ram air circuit, and a compression device arranged in fluid communication with the ram air circuit and the dehumidification system. The compression device includes a compressor, a turbine, and a fan coupled by a shaft, wherein the fan is operable to move ram air through the ram air circuit and the turbine includes a first inlet for receiving a first flow of medium and a second inlet for receiving a second flow of medium.

19 Claims, 5 Drawing Sheets

(51) Int. Cl.
*F04D 19/02* (2006.01)
*F04D 29/54* (2006.01)

(56) References Cited

U.S. PATENT DOCUMENTS

| | | | | |
|---|---|---|---|---|
| 2007/0119205 A1* | 5/2007 | Zywiak | ............. | H05K 7/20927 |
| | | | | 62/401 |
| 2013/0118191 A1* | 5/2013 | Zywiak | ................. | B64D 13/06 |
| | | | | 62/87 |
| 2016/0083100 A1* | 3/2016 | Bammann | ............. | B64D 13/06 |
| | | | | 62/89 |
| 2017/0341761 A1 | 11/2017 | Bruno et al. | | |
| 2017/0341767 A1 | 11/2017 | Bruno et al. | | |
| 2017/0341768 A1* | 11/2017 | Bruno | .................... | B64D 13/06 |
| 2017/0342838 A1* | 11/2017 | Bruno | .................... | F01D 1/023 |

FOREIGN PATENT DOCUMENTS

| | | | |
|---|---|---|---|
| EP | 3249198 | A1 | 11/2017 |
| EP | 3254970 | A1 | 12/2017 |
| EP | 3326915 | A1 | 5/2018 |

OTHER PUBLICATIONS

Communication pursuant to Article 94(3) EPC; International Application No. 19182575.1-1010; International Filing Date: Jun. 26, 2019; dated Mar. 9, 2021; 5 pages.

* cited by examiner

AIRCRAFT ENVIRONMENTAL CONTROL SYSTEM

BACKGROUND

Embodiments of the disclosure relate to environmental control systems, and more specifically to an environmental control system of an aircraft.

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Each of these approaches provides a reduction in airplane fuel burn.

BRIEF DESCRIPTION

According to an embodiment, an environmental control system of an aircraft includes a ram air circuit including a ram air shell having at least one heat exchanger positioned therein, a dehumidification system arranged in fluid communication with the ram air circuit, and a compression device arranged in fluid communication with the ram air circuit and the dehumidification system. The compression device includes a compressor, a turbine, and a fan coupled by a shaft, wherein the fan is operable to move ram air through the ram air circuit and the turbine includes a first inlet for receiving a first flow of medium and a second inlet for receiving a second flow of medium.

In addition to one or more of the features described above, or as an alternative, in further embodiments at least one of the first flow of medium and the second flow of medium is a first medium having a first pressure.

In addition to one or more of the features described above, or as an alternative, in further embodiments the first medium includes a bleed air.

In addition to one or more of the features described above, or as an alternative, in further embodiments at least one of the first flow of medium and the second flow of medium is a second medium having a second pressure.

In addition to one or more of the features described above, or as an alternative, in further embodiments second flow of medium is a fresh air.

In addition to one or more of the features described above, or as an alternative, in further embodiments at least one of the first flow of medium and the second flow of medium includes no flow of medium.

In addition to one or more of the features described above, or as an alternative, in further embodiments the at least one heat exchanger includes a primary heat exchanger and a secondary heat exchanger.

In addition to one or more of the features described above, or as an alternative, in further embodiments the primary heat exchanger is positioned upstream from the turbine.

In addition to one or more of the features described above, or as an alternative, in further embodiments the secondary heat exchanger is positioned downstream from the compressor.

In addition to one or more of the features described above, or as an alternative, in further embodiments the primary heat exchanger is configured to receive a first medium and the secondary heat exchanger is configured to receive a second medium.

In addition to one or more of the features described above, or as an alternative, in further embodiments only a portion of the first medium output from the primary heat exchanger is provided to the turbine.

In addition to one or more of the features described above, or as an alternative, in further embodiments only a portion of the second medium output from the compressor is provided to the secondary heat exchanger.

In addition to one or more of the features described above, or as an alternative, in further embodiments comprising a first outflow heat exchanger arranged downstream from the primary heat exchanger and a second outflow heat exchanger arranged downstream from the secondary heat exchanger.

In addition to one or more of the features described above, or as an alternative, in further embodiments a third medium is provided to the second outflow heat exchanger and the first outflow heat exchanger sequentially.

In addition to one or more of the features described above, or as an alternative, in further embodiments the compression device further comprises a power turbine.

In addition to one or more of the features described above, or as an alternative, in further embodiments the third medium output from the power turbine is provided directly to an inlet of the fan.

In addition to one or more of the features described above, or as an alternative, in further embodiments the turbine has a first nozzle associated with the first inlet and a second nozzle associated with the second inlet, wherein the first nozzle is configured to accelerate the first flow of medium for entry into an impeller of the turbine, and wherein the second nozzle is configured to accelerate the second flow of medium for entry into the impeller of the turbine.

In addition to one or more of the features described above, or as an alternative, in further embodiments the second nozzle is variable in area.

In addition to one or more of the features described above, or as an alternative, in further embodiments the turbine is configured with a first path configured to receive the first medium from the first nozzle and with a second path configured to receive the second medium from the second nozzle.

In addition to one or more of the features described above, or as an alternative, in further embodiments the first flow of medium and the second flow of medium mix at an exit of the turbine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments herein provide an environmental control system of an aircraft that mixes mediums from different sources to power the environmental control system and to provide cabin pressurization and cooling at a high fuel burn efficiency. The medium can generally be air, while other examples include gases, liquids, fluidized solids, or slurries.

Figure 1:
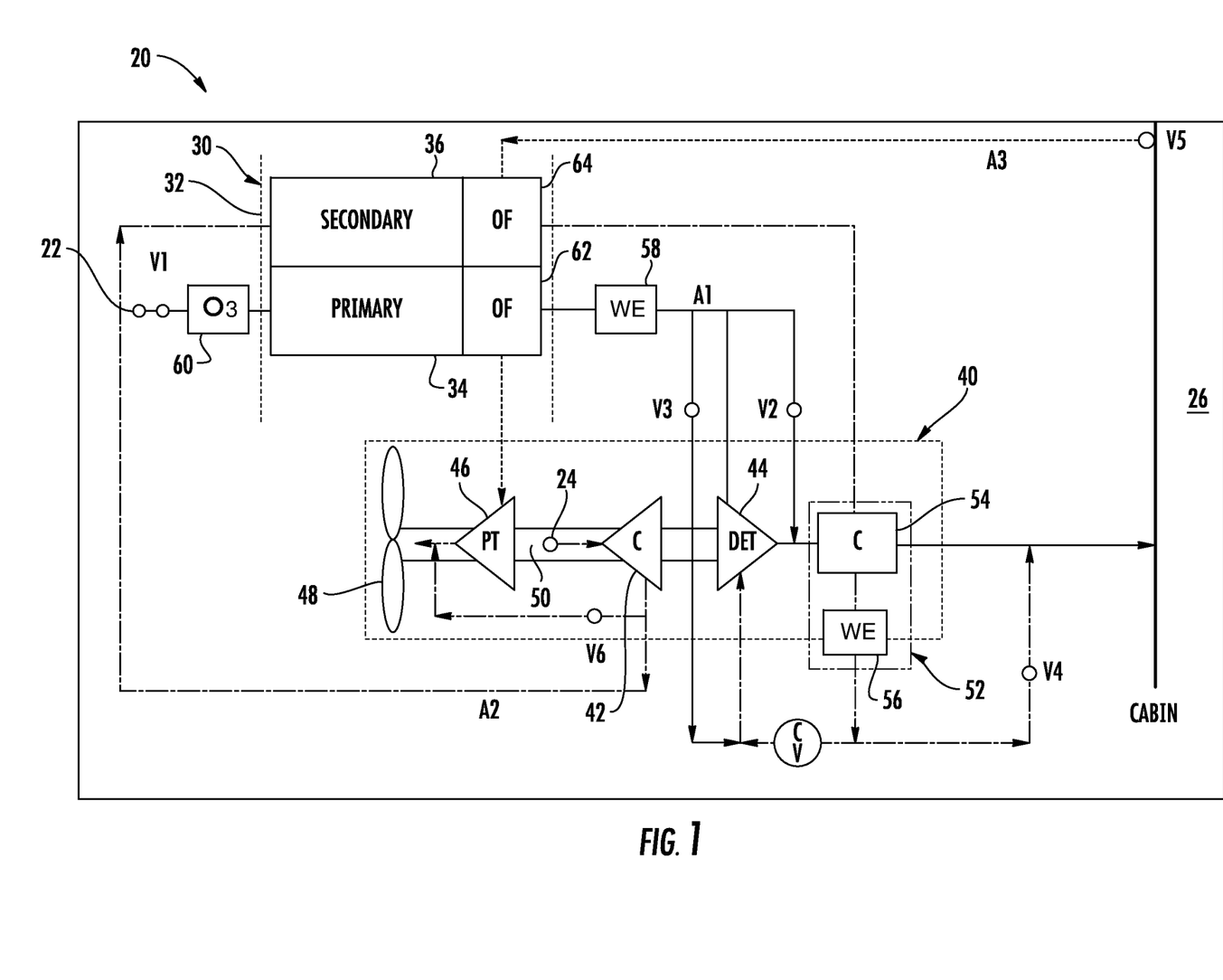
FIG. 1 is a simplified schematic of a system according to an embodiment.

With reference now to FIG. 1, a schematic diagram of a portion of an environment control system (ECS) 20, such as a pack for example, is depicted according to non-limiting embodiments. Although the environmental control system 20 is described with reference to an aircraft, alternative applications are also within the scope of the disclosure. As shown in the FIG., the system 20 can receive a first medium A1 at a first inlet 22. In embodiments where the environmental control system 20 is used in an aircraft application, the first medium A1 is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 also receives a second medium A2 at an inlet 24 and may provide a conditioned form of at least one of the first medium A1 and the second medium A2 to a volume 26. In an embodiment, the second medium A2 is fresh air, such as outside air for example. The outside air can be procured via one or more scooping mechanisms, such as an impact scoop or a flush scoop for example. Thus, the inlet 24 can be considered a fresh or outside air inlet. Generally, the fresh air A2 described herein is at an ambient pressure equal to an air pressure outside of the aircraft when the aircraft is on the ground, and is between an ambient pressure and a cabin pressure when the aircraft is in flight.

The system 20 can further receive a third medium A3 at an inlet 26. In one embodiment, the inlet 26 is operably coupled to a volume 26 is the cabin of an aircraft and the third medium A3 is cabin discharge air, which is air leaving the volume that would typically be discharged overboard. In some embodiments, the system 20 is configured to extract work from the third medium A3. In this manner, the pressurized air A3 of the volume can be utilized by the system 20 to achieve certain operations.

The environmental control system 20 includes a RAM air circuit 30 including a shell or duct, illustrated schematically in broken lines at 32, within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first or primary heat exchanger 34 and a second or secondary heat exchanger 36. Within the heat exchangers 34, 36, ram air, such as outside air for example, acts as a heat sink to cool a medium passing there through, for example the first medium A1 and/or the second medium A2.

The system 20 additionally comprises at least one compression device 40. In the illustrated, non-limiting embodiment, the compression device 40 of the system 20 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of the compression device 40 include an air cycle machine, a three-wheel air cycle machine, a four-wheel air cycle machine, etc.

As shown, the compression device 40 includes a compressor 42, a turbine 44, power turbine 46, and a fan 48 operably coupled to each other via a shaft 50. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2. The first turbine 44 and the power turbine 46 are mechanical devices that expand a medium and extract work therefrom (also referred to as extracting energy) to drive the compressor 42 and the fan 48 via the shaft 50. In an embodiment, the first turbine 44 includes a plurality of inlet fluid flow paths, such as an inner flow path and an outer flow path, to enable mixing of multiple medium flows at the exit of the turbine 44. The inner flow path can be a first diameter, and the outer flow path can be a second diameter. In the compression device 40, the turbines 44, 46 drive the compressor 42 via the shaft 50. The fan 48 is a mechanical device that can force via push or pull methods a medium (e.g., ram air) through the shell 32 across the one or more ram heat exchangers 34, 36 and at a variable cooling to control temperatures.

The system 20 additionally includes a dehumidification system 52. In the illustrated, non-limiting embodiment of FIG. 1, the dehumidification system 52 includes a condenser 54 and a water extractor 56 arranged downstream from the condenser 54. The condenser 54 and the water extractor 56 are arranged in fluid communication with the first medium A1, and in some embodiments, with both the first medium A1 and the second medium A2. The condenser 54 is a particular type of heat exchanger and the water extractor 56 is a mechanical device that performs a process of removing water from a medium. The configuration of the at least one dehumidification system 52 may vary. In an embodiment, the dehumidification system 52 includes an additional water extractor 58 associated with the first medium A1 and located at a position upstream from the first turbine 44. Further, operation of the first turbine 44 may contribute to dehumidification of the first medium received therein.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 is configured to control a supply of the first medium A1 to the system 20. A second valve V2 may be operable to allow a portion of a medium, such as the first medium A1, to bypass the first turbine 44 of the compression device 40. As a result, operation of the second valve V2 may be used to add heat and to drive the compression device 40 during failure modes. The third valve V3 may be operable to provide additional flow of the first medium to a second inlet of the first turbine 44. Operation of a fourth valve V4 is used to allow a portion of the second medium A2 to bypass the first turbine 44 of the compression device 40. The fifth valve V5 is configured to control a supply of a third medium provided to the power turbine 46. Valve V6 may be configured to direct a supply of second medium output from the compressor 42 to the fan inlet of the compression device 40 to provide surge control.

The system 20 is operable in a plurality of modes, selectable based on a flight condition of the aircraft. For example, the system 20 may be operable in a first mode when the aircraft is on the ground or at a low altitude and the system may be operable in a second mode when the aircraft is at a high altitude or in a cruise condition. Operation in a third mode may occur in the event of a failure of a portion of the environmental control system. Similarly, the system may be operable in a fourth mode when 100% fresh air is to be provided to the one or more loads such as the cabin for example.

Figure 2:
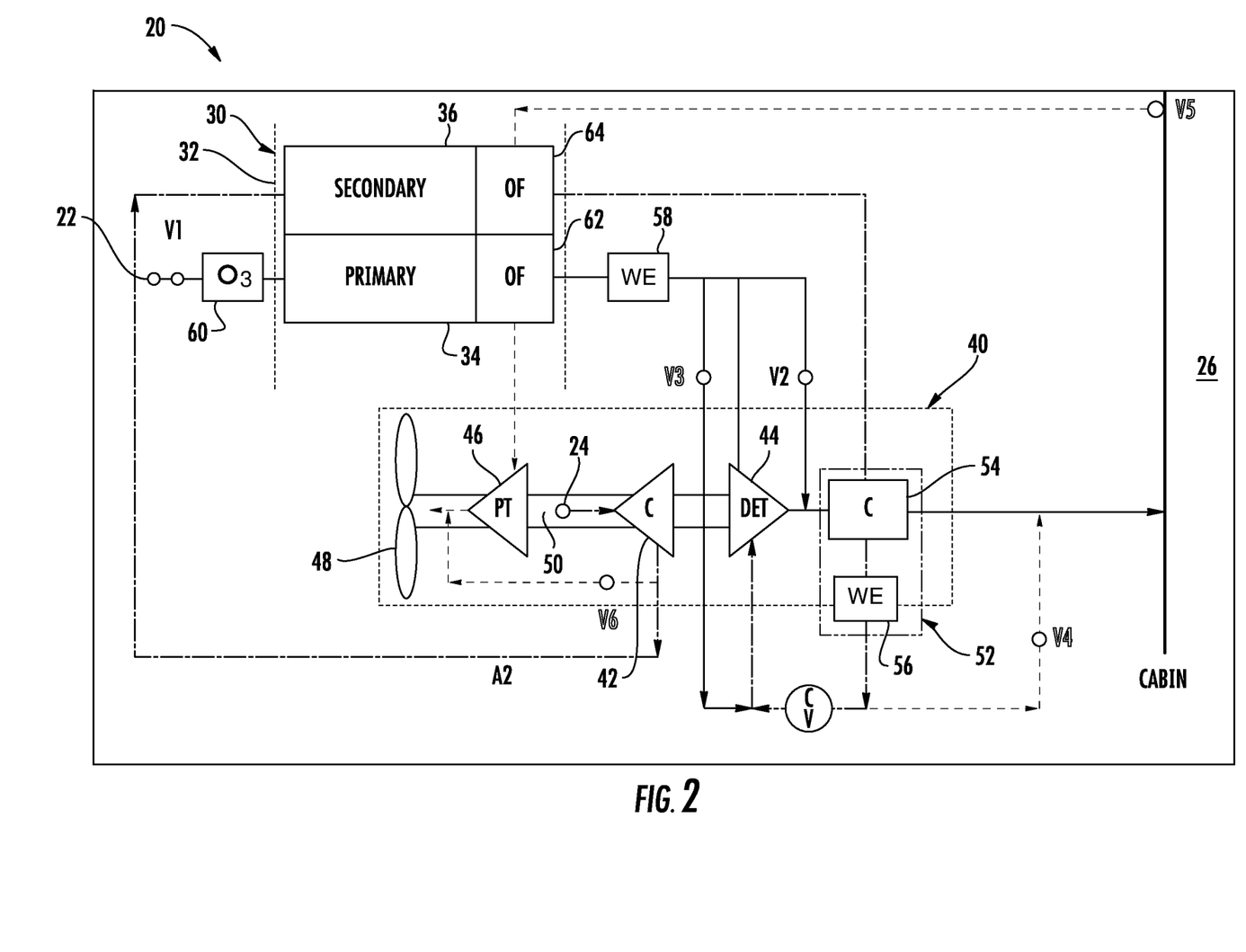
FIG. 2 is a simplified schematic of a system as shown in FIG. 1 operating during ground operation according to an embodiment.

As previously described the first mode of operation, illustrated schematically at FIG. 2, may be considered a low altitude mode of operation. The low altitude mode can be used for ground and low altitude flight conditions, such as ground idle, taxi, take-off, and hold conditions. In this first mode, each of valves V3, V4, V5 and V6 are in a closed configuration. Accordingly, in the first mode of operation, a supply of the third medium A3 is not provided to the system 20.

Valve V1 is open and a high temperature, high pressure first medium A1 drawn through the inlet port 22 may pass through an ozone converter, illustrated at 60, before being provided to the first heat exchanger 34. Within the first heat exchanger 34, the first medium A1 is cooled via a flow of ram air. In the illustrated, non-limiting embodiment, an outflow heat exchanger 62 is positioned directly downstream from the primary heat exchanger 34 relative to the flow of first medium A1. However, in other embodiments, the outflow heat exchanger 62 may be positioned upstream from the primary heat exchanger 34. In such embodiments, the first medium A1 then passes sequentially from the first heat exchanger 34 to the outflow heat exchanger 62 where the first medium A1 is cooled to a nearly ambient temperature. The process of cooling the first medium A1 in the outflow heat exchanger 62 condenses moisture out of the air. Moisture is then removed from the wet first medium A1 within a water extractor 58 of the dehumidification system 60 before being provided to the first inlet of the first turbine 44. However, it should be understood that in other embodiments, the system 20 need not include the outflow heat exchanger 62.

The cool, dry high pressure first medium A1 enters the turbine 44 through a nozzle (e.g., a first nozzle). The cool high pressure first medium A1 is expanded across the turbine 44 and work extracted from the cool high pressure air. This extracted work drives the compressor 42 used to compress a second medium A2, such as fresh outside air. This extracted work also drives the fan 48, which is used to move air through the primary heat exchanger 34 and the secondary heat exchanger 36 (also known as ram air heat exchangers).

The act of compressing the second medium A2, heats the second medium A2. The compressed second medium A2 enters the secondary heat exchanger 36 where it is cooled by ram air. In an embodiment, an outflow heat exchanger 64 is arranged directly downstream from the secondary heat exchanger 36 to further cool the fresh air A2 to nearly ambient temperature. The second medium A2 exiting the outflow heat exchanger 64 is then provided to the condenser 54 and water extractor 56 of the dehumidification system 52 where any free moisture is removed, to produce cool medium pressure air. This cool medium pressure second medium A2 then enters the turbine 44 through a nozzle (e.g., a second nozzle). The cool medium pressure second medium A2 is expanded across the turbine 44 and work extracted from the cool high pressure air.

The two air flows (e.g., the fresh outside air A2 sourcing from inlet 24 and the bleed air A1 sourcing from inlet 22) are mixed at an exit of the turbine 44 to produce a mixed air. The exit of the turbine 44 can be considered a first mixing point of the environmental control system 20. The mixed air leaves the turbine 44 and enters the condenser 54 to cool the secondary air A2 leaving the secondary heat exchanger 36 and/or the outflow heat exchanger 64. The mixed air A1+A2 is then sent to one or more loads of the aircraft, such as to condition the chamber 26.

In embodiments of the low altitude mode where valve V2 is open, a portion of the first medium A1 output from the primary heat exchanger 34 or the outflow heat exchanger 62, may be configured to bypass the turbine 44. In such embodiments, this cool air is added to the mixture of first and second medium A1+A2 output from the turbine 44, upstream from the condenser 54 to at least partially control the temperature of the air provided to the one or more downstream loads.

Figure 3:
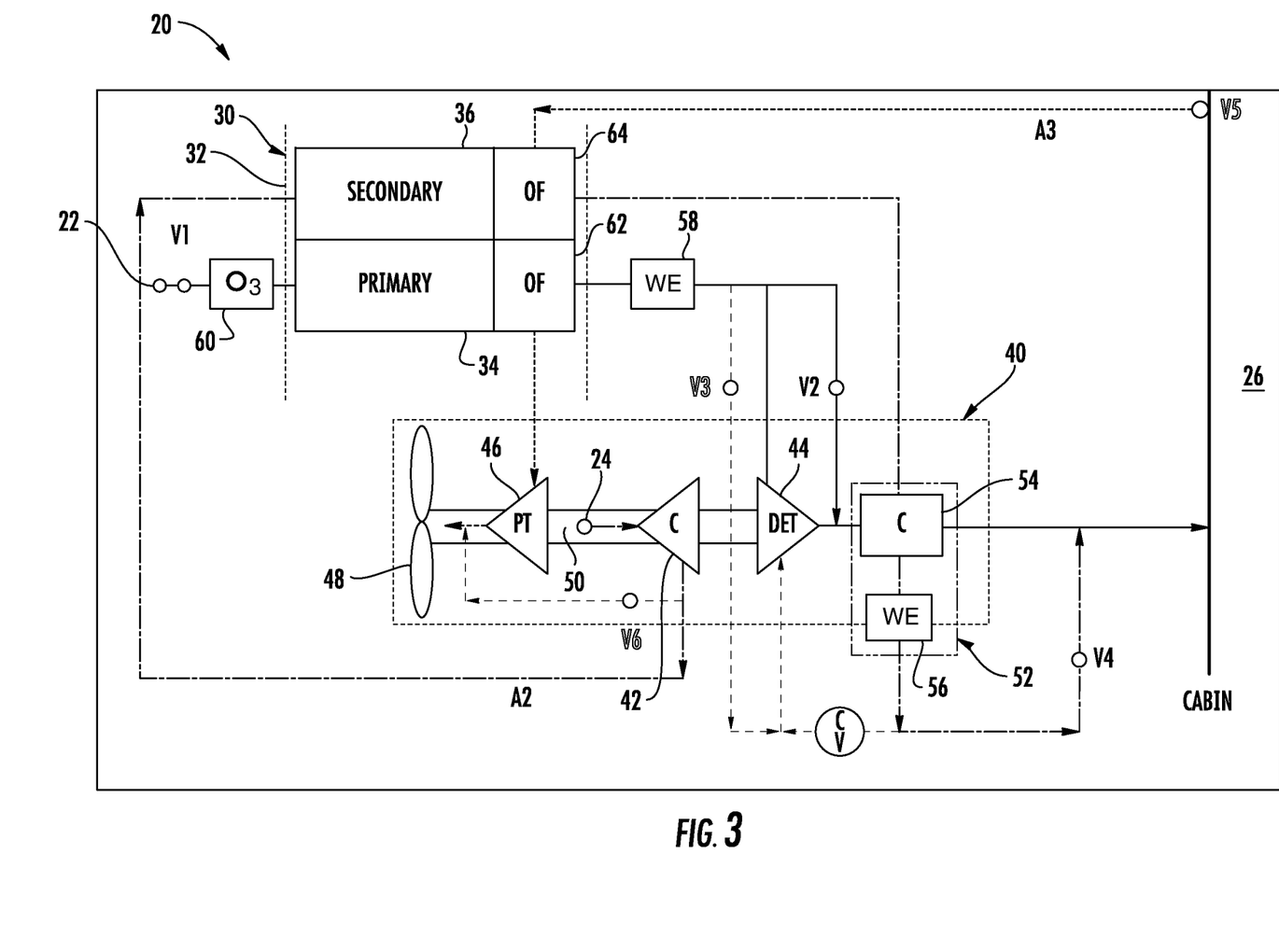
FIG. 3 is a simplified schematic of a system as shown in FIG. 1 operating during high altitude operation according to an embodiment.

The second mode of the system 20, illustrated schematically at FIG. 3, can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 24 and the bleed air sourcing from inlet 22). Further, depending on an altitude of the aircraft, an amount of bleed air needed can be reduced. In this way, the environmental control system 20 provides bleed air reduction ranging from 40% to 75% to provide higher efficiencies with respect to engine fuel burn than contemporary airplane air systems.

The second mode of operation is similar to the first mode. However, in the second mode, the second medium A2 is mixed with the first medium A1 downstream of the turbine 44, rather than within the turbine 44. In the second mode of operation, the flow of the first medium A1 through the system 20 is substantially identical to the first, low altitude mode of operation. As shown, the third medium A3, such as cabin discharge air for example, is used to further cool the first medium A1 and the second medium A2 within the outflow heat exchangers 62, 64, respectively. From the outflow heat exchangers 62, 64 the third medium A3 is provided to the power turbine 46. The third medium A3 is expanded across the power turbine 46 such that work is extracted therefrom. This extracted work drives the compressor 42 and the fan 48. In an embodiment, the third medium output from the power turbine 46 is provided directly to a fan inlet. This is distinguishable from embodiments where the third medium may be dumped overboard or into the ram air duct 32.

Simultaneously, a supply of second medium A2 drawn from port 24 is compressed within the compressor 42 causing the temperature of the second medium A2 to increase. The second medium A2 output from the compressor 42 passes sequentially through a secondary heat exchanger 36 and an outflow heat exchanger 64 to cool the second medium A2 to about an ambient temperature. The second medium A2 discharged from the outflow heat exchanger 64 is then provided to the condenser 54 and water extractor 56 of the dehumidification system 52 where any free moisture is removed, to produce cool medium pressure air.

In the second, high altitude mode of operation, valves V3 and V6 are in a closed configuration, and valves V4 and V5 are in an open configuration. Because valve V4 is open, this cool, medium pressure second medium A2 is configured to bypass the turbine 44. Instead, the second medium A2 is directed by the valve V4 to downstream of the turbine 44 and/or downstream of the condenser 54 where the second medium A2 is configured to mix with the first medium A1 output from the turbine 44, and in some embodiments, with the first medium A1 that bypassed the turbine 44 via valve V2. This mixture of first and second mediums A1+A2 can then be provided to one or more loads of the aircraft. The location at which this cool medium pressure air A2 mixes with the bleed air A1, which is sourced from the inlet 22 and exiting the condenser 54, can be considered a second mixing point of the environmental control system 20.

Figure 4:
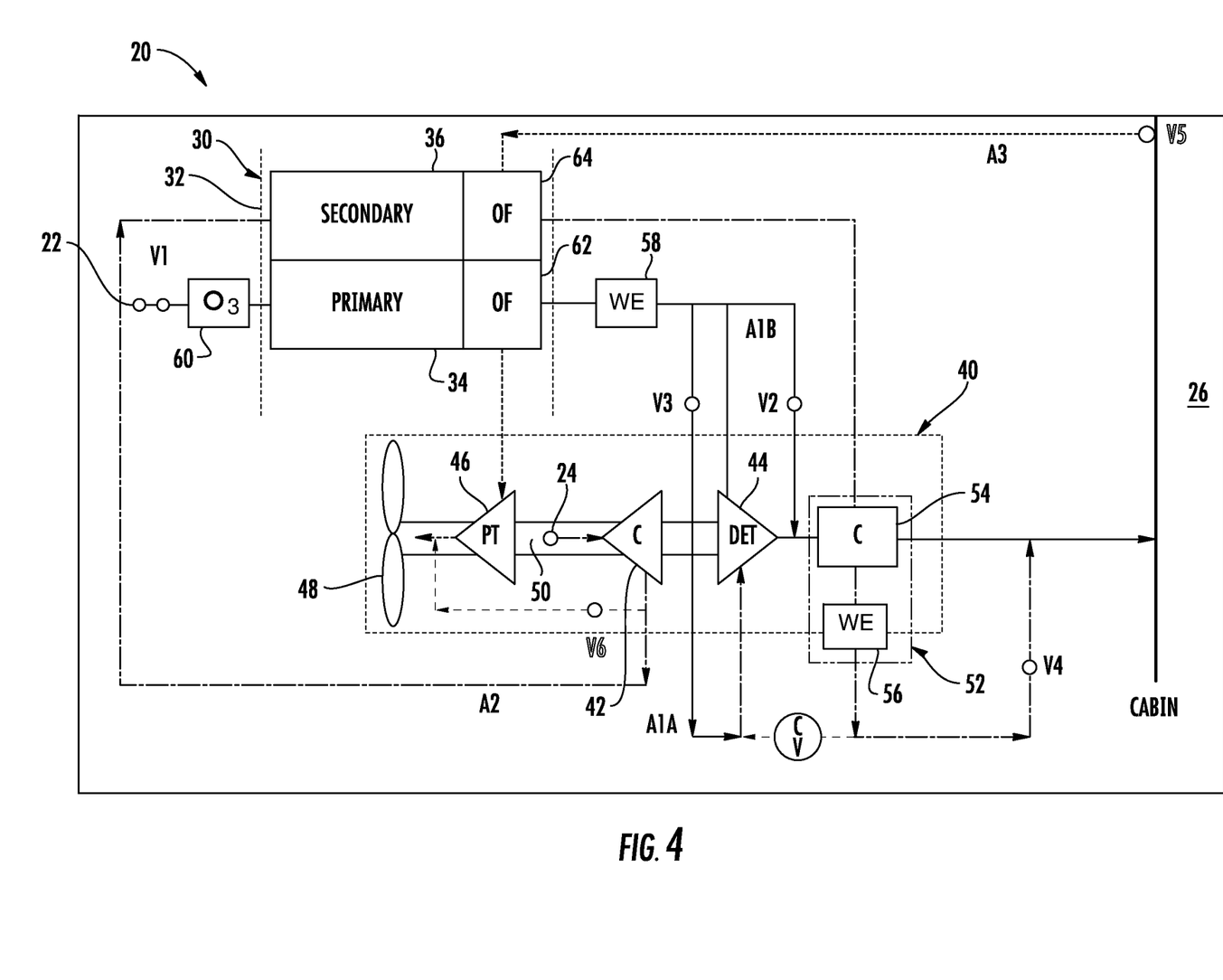
FIG. 4 is a simplified schematic of a system as shown in FIG. 1 operating during single pack cruise operation according to an embodiment.

The system 20 is configured to operate in a third mode during a failure of the environmental control system, such as when only a single ECS pack 20, for example the pack shown in the FIGS., is operational. The third mode of operation, as illustrated schematically in FIG. 4, is similar to the second mode; however in the third mode, valve V3 is also open. As a result, a first portion A1A of the first medium A1 output from the outflow heat exchanger 62 is provided to the first nozzle of the first turbine 44 and a second portion A1B of the first medium A1 output from the outflow heat exchanger 62 is provided to the second nozzle of the first turbine 44. By providing two distinct flows of the high pressure first medium to the first turbine 44, a greater amount of power can be extracted from the first medium and used to drive the compressor 42, resulting in an increased flow. The two portions of the first medium A1A, A1B are mixed at an exit of the turbine 44 before entering the condenser 54 to cool the secondary air A2 leaving the secondary heat exchanger 36 and/or the outflow heat exchanger 64. The first medium A1 is then combined with a flow of second medium A2, provided via valve V4 downstream from the condenser 54, prior to being sent to one or more loads of the aircraft, such as to condition the chamber 26.

Figure 5:
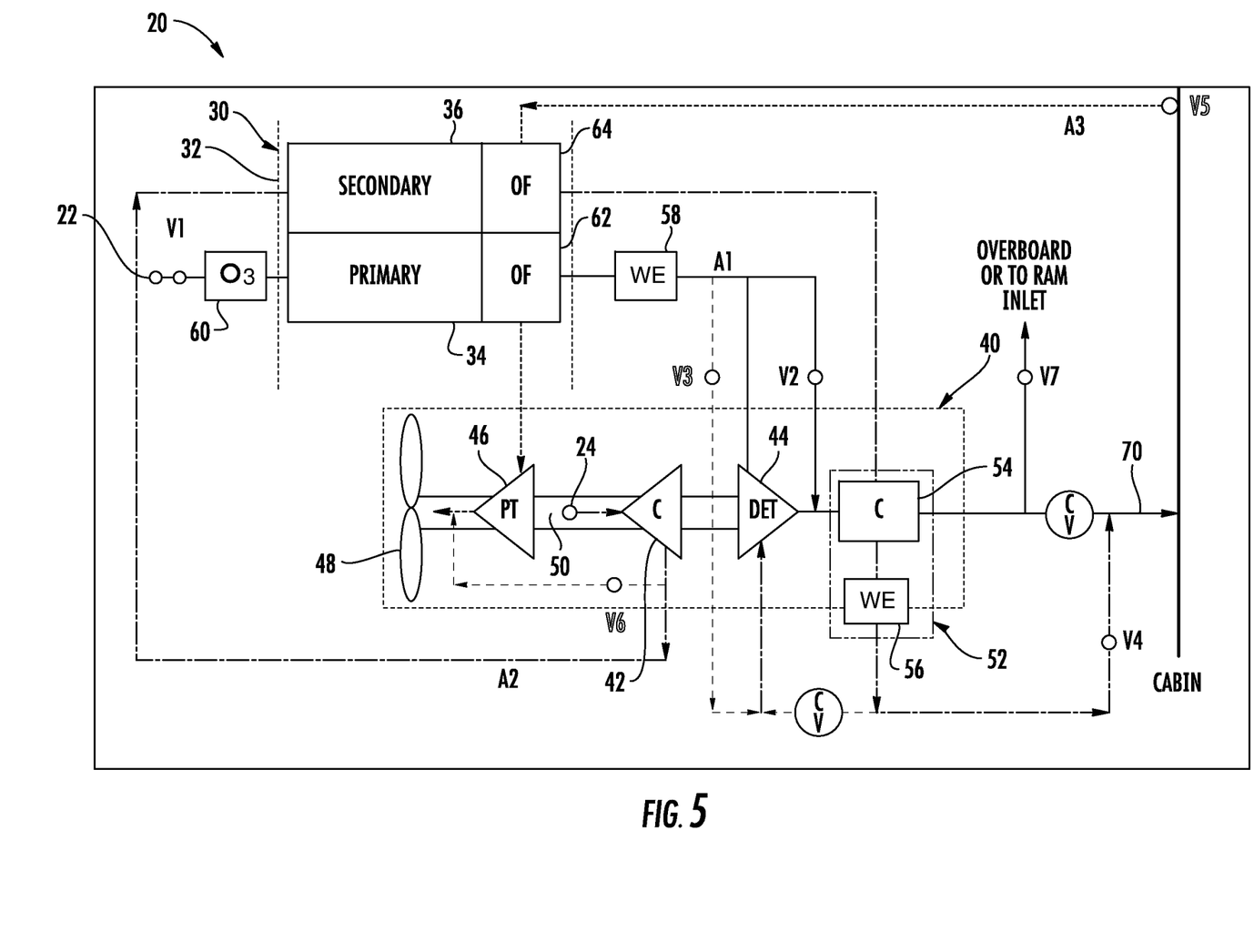
FIG. 5 is a simplified schematic of a system as shown in FIG. 1 operating in a 100% fresh air mode according to an embodiment.

With reference now to FIG. 5, the system is configured to operate in a fourth mode. In the illustrated, non-limiting embodiment, the fourth mode is a "Fresh air" mode where only fresh air is distributed from the system 20 to one or more downstream loads. The fourth mode of operation is similar to the second mode except that in the fourth mode, a valve V7 is also open. Valve V7 is located in fluid communication with the conduit 70 extending between the outlet of the condenser 54 and the one or more downstream loads. In the illustrated, non-limiting embodiment, the valve V7 is located upstream from the location where the second medium A2 passing through valve V4 is provided to the conduit 70, and also upstream from a check valve 72. As a result, when valve V7 is open, the first medium A1 output from the exit of the turbine 44 is configured to flow through condenser 54, and then is diverted through valve V7 where the first medium is dumped overboard or into a ram exhaust flow. As a result, only the second medium A2 provided to the conduit 70 is then supplied to one or more downstream loads.

The system 20 illustrated and described herein additionally includes a valve V6 operable to provide surge control protection. For example, if the flow provided to the power turbine 46 of the compression device 40 is interrupted, the valve V6 is opened such that a portion of the compressed second medium A2 output from the compressor 42 is diverted to the fan inlet to rotate the fan 48 and drive movement of ram air through the circuit 30. In an embodiment, the loss or interruption of third medium A3 may be monitored by a sensor, and the valve V6 may be operable in response to that sensor.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft comprising:
    a ram air circuit including a ram air shell having at least one heat exchanger positioned therein;
    a dehumidification system arranged in fluid communication with the ram air circuit; and
    a compression device arranged in fluid communication with the ram air circuit and the dehumidification system, the compression device including a compressor, a turbine, and a fan coupled by a shaft, the fan being operable to move ram air through the ram air circuit and the turbine includes a first inlet for receiving a first flow of medium and a second inlet for receiving a second flow of medium;
    wherein the second flow of medium is provided to and output from the compressor, and an outlet of the compressor is directly connected to an inlet of the fan such that a portion of the second flow of medium output from the compressor is selectively providable directly to the inlet of the fan.

2. The environmental control system of claim 1, wherein at least one of the first flow of medium and the second flow of medium is a first medium having a first pressure.

3. The environmental control system of claim 2, wherein the first medium includes a bleed air.

4. The environmental control system of claim 2, wherein at least one of the first flow of medium and the second flow of medium is a second medium having a second pressure.

5. The environmental control system of claim 2, wherein the second flow of medium is a fresh air.

6. The environmental control system of claim 1, wherein the at least one heat exchanger includes a primary heat exchanger and a secondary heat exchanger.

7. The environmental control system of claim 6, wherein the primary heat exchanger is positioned upstream from the turbine.

8. The environmental control system of claim 6, wherein the secondary heat exchanger is positioned downstream from the compressor.

9. The environmental control system of claim 6, wherein the primary heat exchanger is configured to receive the first flow of medium and the secondary heat exchanger is configured to receive the second flow of medium.

10. The environmental control system of claim 9, wherein only a portion of the first flow of medium output from the primary heat exchanger is provided to the turbine.

11. The environmental control system of claim 9, wherein only a portion of the second flow of medium output from the compressor is provided to the secondary heat exchanger.

12. The environmental control system of claim 9, further comprising:
   a first outflow heat exchanger arranged downstream from the primary heat exchanger; and
   a second outflow heat exchanger arranged downstream from the secondary heat exchanger.

13. The environmental control system of claim 12, wherein a third flow of medium is provided to the second outflow heat exchanger and the first outflow heat exchanger sequentially.

14. The environmental control system of claim 13, wherein the compression device further comprises a power turbine.

15. The environmental control system of claim 14, wherein the third flow of medium is provided to the power turbine and is output from the power turbine directly to an inlet of the fan.

16. The system of claim 9, wherein the first flow of medium and the second flow of medium mix at an exit of the turbine.

17. The system of claim 1, wherein the turbine has a first nozzle associated with the first inlet and a second nozzle associated with the second inlet, wherein the first nozzle is configured to accelerate the first flow of medium for entry into an impeller of the turbine, and wherein the second nozzle is configured to accelerate the second flow of medium for entry into the impeller of the turbine.

18. The system of claim 17, wherein the second nozzle is variable in area.

19. The system of claim 18, wherein the turbine is configured with a first path configured to receive the first flow of medium from the first nozzle and with a second path configured to receive the second flow of medium from the second nozzle.

* * * * *